US008682954B2

(12) United States Patent
Harpaz et al.

(10) Patent No.: US 8,682,954 B2
(45) Date of Patent: Mar. 25, 2014

(54) REPLICATION IN A NETWORK ENVIRONMENT

(75) Inventors: Avraham Harpaz, Haifa (IL); Nir Naaman, Haifa (IL); Idan Zach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 938 days.

(21) Appl. No.: 12/503,087

(22) Filed: Jul. 15, 2009

(65) Prior Publication Data

US 2011/0016349 A1  Jan. 20, 2011

(51) Int. Cl.
*G06F 15/16* (2006.01)

(52) U.S. Cl.
USPC .......................................... 709/201; 709/219

(58) Field of Classification Search
USPC .......................................... 709/201, 213, 219
See application file for complete search history.

(56) References Cited

U.S. PATENT DOCUMENTS

| 6,247,141 | B1 * | 6/2001 | Holmberg ........................... 714/2 |
| 6,625,751 | B1 * | 9/2003 | Starovic et al. ................. 714/11 |
| 6,772,363 | B2 * | 8/2004 | Pedone et al. .................. 714/4.3 |
| 7,188,273 | B2 * | 3/2007 | Allen et al. ..................... 714/6.3 |
| 7,228,452 | B2 * | 6/2007 | Moser et al. .................... 714/4.1 |
| 7,725,764 | B2 * | 5/2010 | Morosan et al. ............. 714/4.12 |
| 2003/0154236 | A1 * | 8/2003 | Dar et al. ....................... 709/201 |
| 2004/0103103 | A1 | 5/2004 | Kalthoff et al. |
| 2008/0052327 | A1 | 2/2008 | Buah |
| 2008/0310423 | A1 | 12/2008 | Dekel et al. |
| 2008/0310444 | A1 | 12/2008 | Dekel et al. |

FOREIGN PATENT DOCUMENTS

EP  1019822  1/2002

OTHER PUBLICATIONS

George Ahrens et al., "Evaluating HACMP/6000: A Clustering Solution for High Abailability Distributed System", IEEE 1995 Source: http://ieeexplore.ieee.org/xpls/abs_all.jsp?tp=&arnumber=494467&isnumber=10677.
Yair Amir et al, Transis: A Communication Sub-System for High Availability, 1992 Source: http://citeseerx.ist.psu.edu/viewdoc/summary?doi=10.1.1.37.2915.
Websphere MQ Low Latency Messaging Source: http://www-01.ibm.com/software/integration/wmq/llm/about/.
D. Powell et al., "Active replication in Delta-4", Fault-Tolerance Computing, 1992, FTCS-22, pp. 28-37.
D. Powell et al., "Fault-tolerance in Delta-4." ACM Operating Systems Review, SIGOPS, 25(2):122-125, Apr. 1991.
P. Felber et al., "Optimistic active replication", Distributed Computing Systems, 2001, pp. 333-341.
M. Wiesmann et al., "Understanding replication in databases and distributed systems", Proceedings of 20th International Conference on Distributed Computing Systems, 2000. pp. 464-474.

* cited by examiner

*Primary Examiner* — Kristie Shingles

(57) ABSTRACT

A method for server replication in a network environment is provided. The primary server provides a first service to a client. If the first service involves interaction with a non-deterministic data source, the primary server performs the interaction and provides information about the interaction to a secondary server that is a replica of the primary server. The secondary server uses the information about the interaction to synchronize the secondary server with the primary server.

8 Claims, 8 Drawing Sheets

REPLICATION IN A NETWORK ENVIRONMENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of the claimed subject matter to material associated with such marks.

TECHNICAL FIELD

The claimed subject matter relates generally to replication in a network environment and, more particularly, to server replication that supports interactions with non-deterministic data sources.

BACKGROUND

Replication, in computing context, refers to copying, or replicating, a computing environment (e.g., a server system) multiple times to increase availability of services provided through that computing environment. Each replica or copy receives the same input, performs the same operations, and produces the same output. As a result, the replicated computing environment or server system remains operational as a collective sum, even if one of the replicas becomes non-operational.

Unfortunately, existing systems and methods for replicating a server system fail to efficiently support interactions with non-deterministic data sources. A non-deterministic data source refers to a data source (e.g., a database) that may return a different output each time, in response to receiving the same input. For example, a database that is dynamically updated by multiple independent processes may return different results for a query each time depending on the point in time in which the query is performed.

In one existing implementation, non-deterministic data sources may be supported by synchronizing the state of each replica with the state of a selected replica at certain points in time (i.e., checkpoints). In another existing implementation, access to each non-deterministic data source may be synchronized using a locking mechanism. Such existing implementations, however, result in high overhead, particularly with respect to the time required to respond to a client request.

SUMMARY

The present disclosure is directed to systems and corresponding methods that facilitate replication in a network environment.

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for server replication in a network environment is provided. The primary server provides a first service to a client. If the first service involves interaction with a non-deterministic data source, the primary server performs the interaction and provides information about the interaction to a secondary server that is a replica of the primary server. The secondary server uses the information about the interaction to synchronize the secondary server with the primary server.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1A:
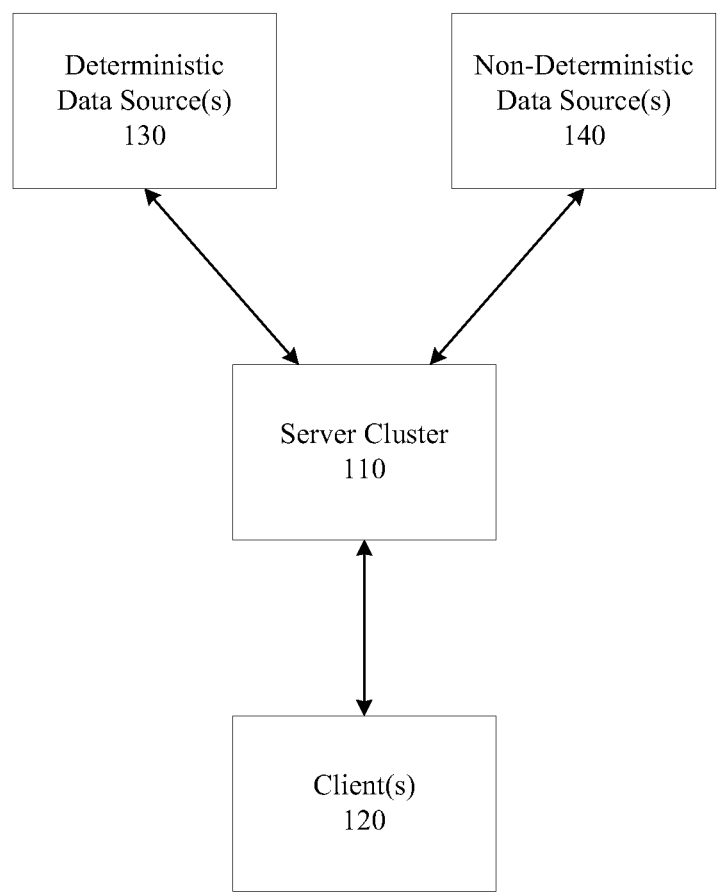
FIGS. 1A and 1B illustrate an exemplary network environment, in accordance with one or more embodiments.

Referring to FIG. 1A, in accordance with one embodiment, an exemplary network environment 100 comprises a server cluster 110 for providing services to one or more clients 120. A server cluster refers to a group of one or more servers (e.g., computing environments or machines) that are configured desirably as replicas, or identical copies, of one another. A server refers to a computing system that provides services to a client. A client refers to a computing system that requests and receives services provided by a server.

The services provided to the clients 120 by the server cluster 110 may involve interaction with one or more data sources 130, 140. A data source refers to a logical entity (e.g., a data structure) or a computing system (e.g., a database system), or a combination of thereof, from which data can be retrieved. It is noteworthy that a data source may be external to a server or client, as shown in FIG. 1A, or comprised within a server or client (not shown). Each deterministic data source 130 returns the same output each time, in response to receiving the same input. Each non-deterministic data source 140, however, may return a different output each time, in response to receiving the same input.

Figure 1B:
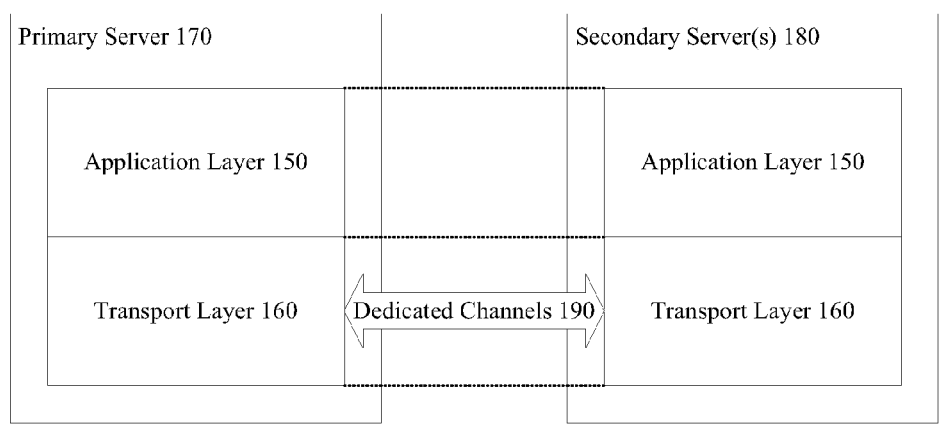

Referring to FIGS. 1A and 1B, in accordance with one embodiment, one or more servers 170, 180 may be utilized to implement a server cluster 110. An application layer 150 may be implemented over the servers 170, 180 to execute one or more software applications to service clients 120. A transport layer 160 may be implemented over the servers 170, 180 to provide a means of communication between the servers 170, 180 and the clients 120 using a reliable messaging protocol. The transport layer 160 may also provide one or more communication channels 190 for reliable messaging within the server cluster 110. A dedicated communication channel 190 may be provided for communication between the primary server 170 and each of the secondary servers 180.

In some embodiments, the application and communication functionalities may be implemented as separate, independent layers to allow for a less complex system configuration and to desirably facilitate the use of a common transport layer by different applications. Alternatively, the application and communication functionalities may be combined into a single layer or divided into more than two layers. It is noteworthy that, in the embodiments provided below, certain functionalities attributed to one layer may be performed by another layer.

Referring back to FIGS. 1A and 1B, the server cluster 110 may utilize a synchronization mechanism (not shown). The synchronization mechanism may configure one of the servers in the server cluster 110 to be a primary server 170 (e.g., a master server) and the remaining servers in the server cluster 110 to be secondary servers 180 according to a distributed election protocol. The primary server 170 may be configured to directly communicate with the data sources 130, 140 and synchronize communications between the servers 170, 180 in the server cluster 110 and the data sources 130, 140.

In the following descriptions, the synchronization mechanism is disclosed as being implemented over the transport layer 160, by way of example. It is noteworthy, however, that the same or a similar synchronization mechanism may be implemented over the application layer 150, another layer in the network environment 100, or a combination of different layers or systems.

Additionally, in the following, interaction with a non-deterministic data source 140 has been defined as triggered by receiving a message from a client 120. It is noteworthy, however, that the interaction may be triggered by other system components or means, and, once the trigger is invoked, the primary server 170 may forward a message to itself and the secondary servers 180 to perform the interaction, for example.

Figure 2:
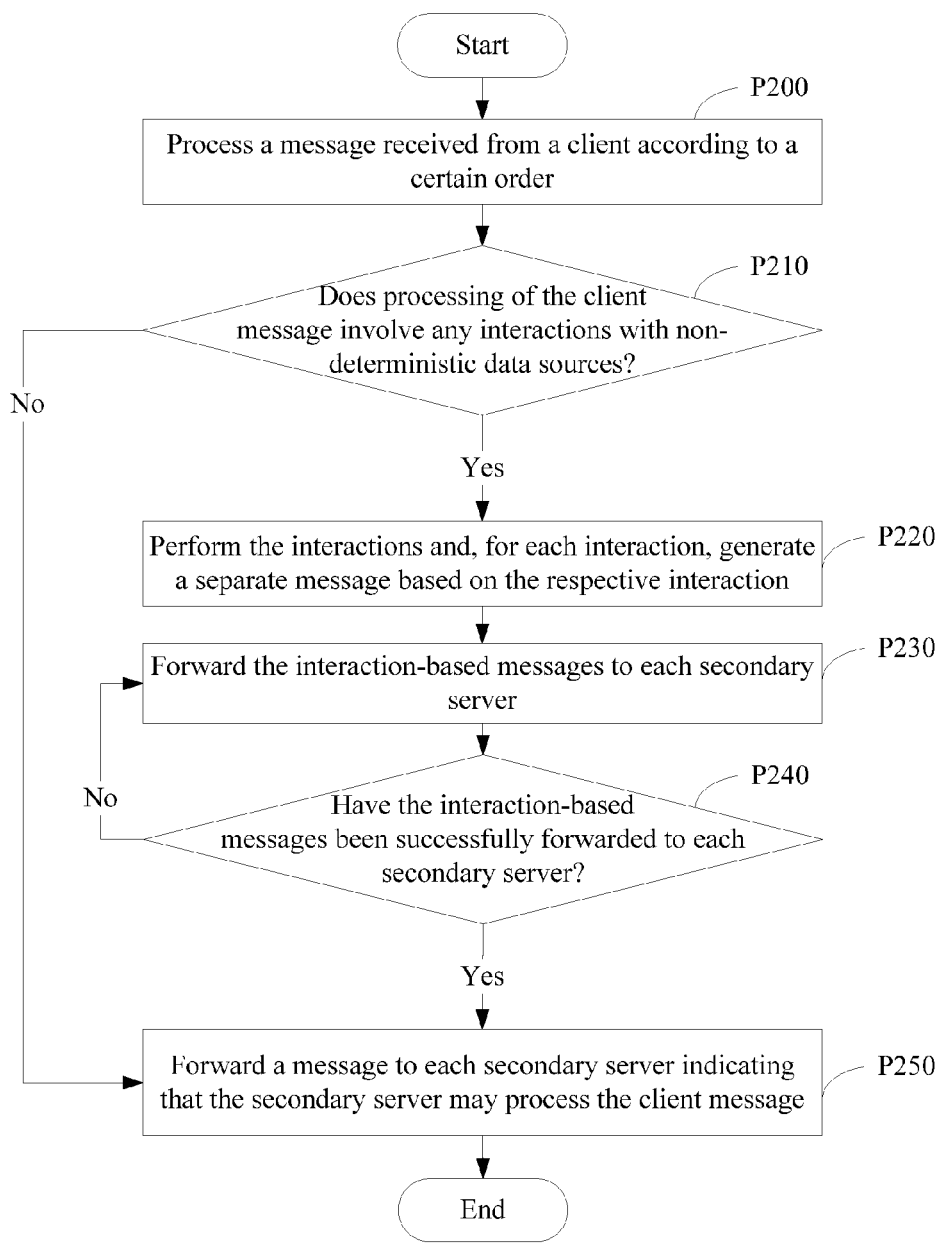
FIG. 2 is a flow diagram of a method for supporting interaction with a non-deterministic data source by a primary server, in accordance with one embodiment.

Referring to FIGS. 1A, 1B, and 2, in accordance with one embodiment, the transport layer 160 on the primary server 170 or a secondary server 180 receives a message from a client 120 and forwards the client message to the application layer 150 on the primary server 170 for processing (P200).

In one implementation, the client message may be associated with a sequence number or other identification to enable the application layer 150 to process client messages according to a certain order. Processing client messages according to a certain order (e.g., according to sequence number) causes the primary server 170 and the secondary servers 180 to process each client message in accordance with the same logic or state.

If processing the client message does not involve any interactions with a non-deterministic data source 140 (P210), the application layer 150 on the primary server 170 forwards a confirmation message to each secondary server 180, desirably by way of a dedicated communication channel 190, to indicate that the secondary server 180 may process the client message (P250). In one implementation, the confirmation message may be forwarded once the primary server 170 completes processing the client message. Alternatively, the confirmation message may be forwarded periodically or after a certain number of client messages have been processed to increase efficiency.

Otherwise, if processing the client message involves one or more interactions with a non-deterministic data source 140, the application layer 150 on the primary server 170 performs the interactions, and for each interaction, desirably generates a separate message based on the respective interaction (P220).

An interaction-based message comprises information relevant to the secondary servers 180 for processing the client message in the same manner as the primary server 170. The content of the interaction-based message may provide information about the interaction or the results of the interaction (e.g., that the primary server 170 has locked a database record), for example. Desirably, the detection of an interaction-based message may by itself be used to indicate that there is an interaction to be synchronized with the secondary servers 180, for example.

Upon generating the interaction-based messages, the transport layer 160 on the primary server 170 forwards the interaction-based messages to each secondary server 180 desirably by way of the dedicated communication channels 190 (P230). Once the interaction-based messages have been successfully forwarded to each secondary server 180 (P240), the transport layer 160 on the primary server 170 forwards a confirmation message to each secondary server 180, by way of the dedicated communication channels 190, to indicate that the secondary server 180 may process the client message (P250).

In one implementation, the application layer 150 on the primary server 170 may determine that the interaction-based messages have been successfully forwarded to each secondary server 180 upon being informed to that effect by the transport layer 160. The transport layer 160 may inform the application layer 150 that the interaction-based messages have been successfully forwarded to each secondary server 180, for example, in response to receiving a message acknowledging receipt of the interaction-based message from each secondary server 180.

Figure 3A:
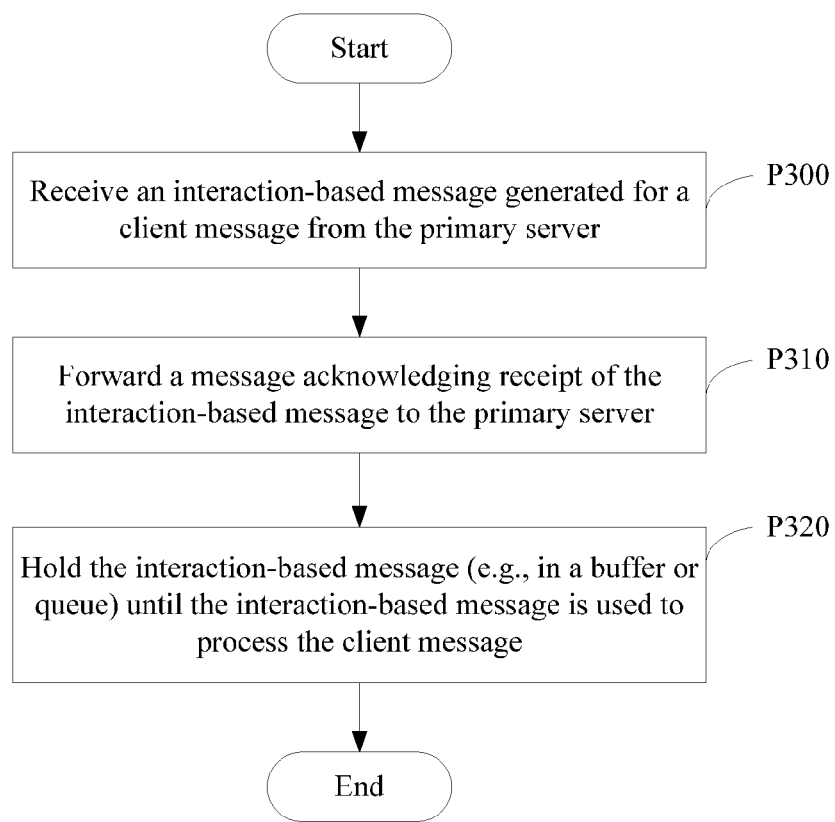
FIGS. 3A, 3B, and 4 are flow diagrams of methods for supporting interaction with a non-deterministic data source, in accordance with one or more embodiments.

Referring to FIGS. 1A, 1B, and 3A, in accordance with one embodiment, the transport layer 160 on a secondary server 180 receives an interaction-based message from the primary server 170 by way of a dedicated communication channel 190 (P300).

In response to receiving the generated message, the transport layer 160 forwards a message confirming receipt of the interaction-based message to the primary server 170, by way of the 190 communication channel (P310). The transport layer 160 also forwards the interaction-based message to the application layer 150 on the secondary server 180.

Upon receiving the interaction-based message, the application layer 150 holds the interaction-based message (e.g., in a buffer or queue) until the secondary server 180 uses the interaction-based message to process the client message (P320). In one implementation, the interaction-based message may be stored according to a certain order or associated with a sequence number or other identification to enable the application layer 150 to use the interaction-based messages according to the certain order.

Figure 3B:
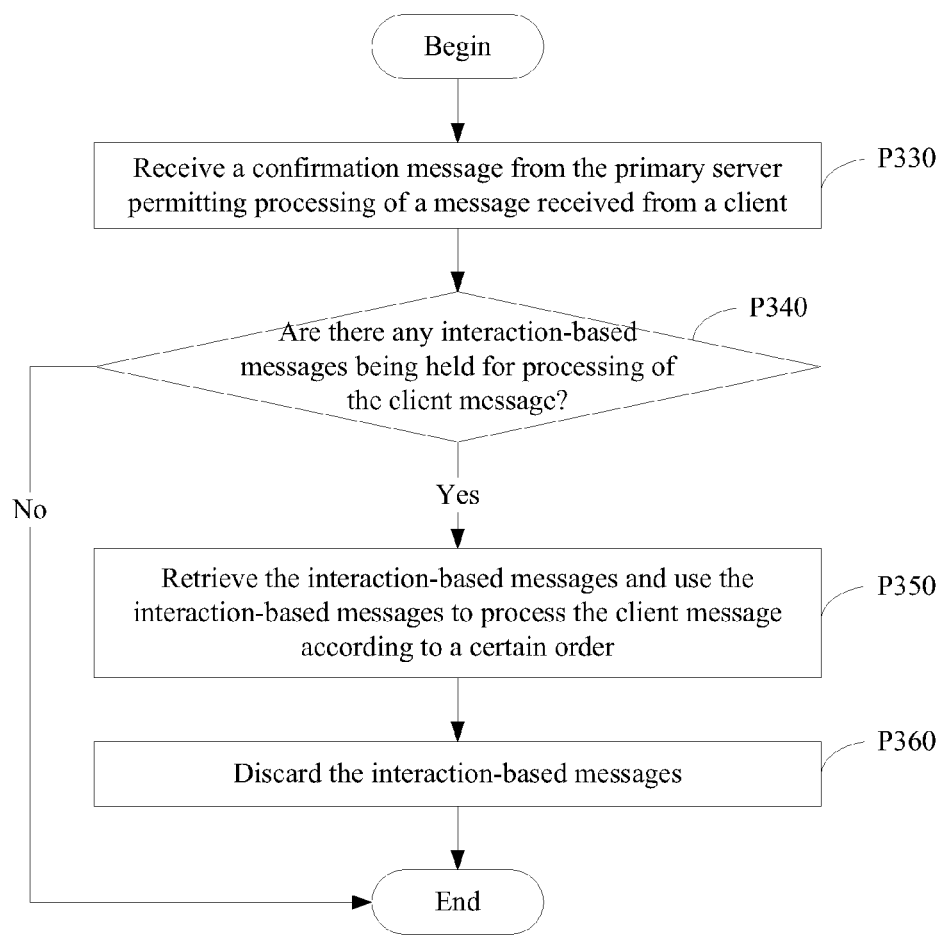

Referring to FIGS. 1A, 1B, and 3B, in accordance with one embodiment, the transport layer 160 on a secondary server 180 receives a message from the primary server 170, by way of a dedicated communication channel 190, permitting the application layer 150 on the secondary server 180 to process a message received from a client 120 (P330). In one implementation, the client message may be associated with a sequence number or other identification to enable the application layer 150 to process the client message according to a certain order.

Once the application layer 150 on the secondary server 180 is permitted to process the client message, the application layer 150 on the secondary server 180 determines whether there are any interaction-based messages being held for processing of the client message (P340). If so, the application layer 150 on the secondary server 180 retrieves the interaction-based messages and uses the interaction-based messages according to the certain order to process the client message (P350) and discards the interaction-based messages (P360).

Preventing the application layer 150 on the secondary server 180 from processing the client message until permission is received from the primary server 170 causes the application layer 150 on the secondary server 180 to process the client message after receiving each interaction-based message generated for the client message. Since the interaction-based messages are retrieved and used according to a certain order, the primary server 170 and the secondary servers 180 arrive at the same logic point or state after processing each client message.

For example, before processing the client message, the primary server 170 and a secondary server 180 may be at the same logic point A. Once the primary server 170 starts processing the client message and performs an interaction D1 with a non-deterministic data source, the primary server 170 may arrive at logic state B; and, once the primary server 170 performs an interaction D2 with a non-deterministic data source, the primary server 170 may arrive at logic state C. Then, once the primary server 170 finishes processing the client message, the primary server 170 may arrive at logic state D.

In the above example, if the secondary server 180 waits to process the client message until receiving interaction-based messages M1 and M2 generated for the interactions D1 and D2, respectively, the secondary server 180 may be able to process the client message in the same manner as the primary server 170 and arrive at the same logic state upon finishing. During the processing, the secondary server 180 may use the message M1 instead of performing the interaction D1 to arrive at logic state B and the message M2 instead of performing the interaction D2 to arrive at logic state C. Then, once the primary server 180 finishes processing the client message, the secondary server 180 may arrive at logic state D.

In certain scenarios, a secondary server 180 may utilize the content of an interaction-based message to process a client message. For example, a server may retrieve data from a database (i.e., perform an interaction with a data source) and provide the data to a client, in response to receiving a data request (i.e., client message). In such a scenario, the content of the interaction-based message may include the data, and the data may be provided to the client 120.

In other scenarios, a secondary server 180 may utilize the existence of an interaction-based message to process a client message. For example, a secondary server 180 may perform a default action independent of the content of an interaction-based message, in response to receiving the interaction-based message from the primary server 170.

Figure 4:
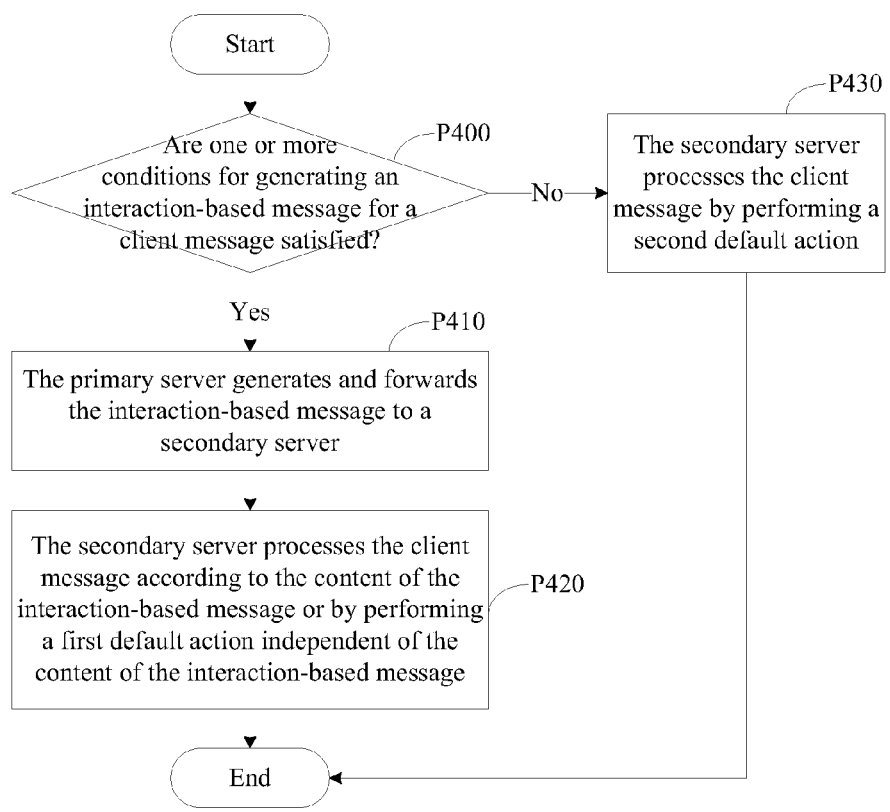

Referring to FIGS. 1A, 1B, and 4, in accordance with one embodiment, the primary server 170 may generate an interaction-based message to a secondary server 180 according to one or more conditions.

If one or more conditions for generating an interaction-based messaged for a client message are satisfied (P400), the primary server 170 generates and forwards the interaction-based message to the secondary server 180 (P410), and the secondary server 180 processes the client message according to the content of the interaction-based message or by performing a first default action independent of the content of the interaction-based message (P420). Otherwise, the primary server 170 does not generate and forward the interaction-based message to the secondary server 180; and the secondary server 180 processes the client message by performing a second default action, in response to failing to receive the interaction-based message (P430).

For example, a server may provide online shopping services to a client, which involves validating a purchase order (i.e., performing an interaction with a data source), in response to receiving the purchase order (i.e., client message) from a client. In such a scenario, the application layer 150 on the server may generate an interaction-based message if the validation fails, but may not generate the interaction-based message if the validation succeeds.

Desirably, limiting the generation of an interaction-based message according to one or more conditions significantly increases the performance of a server cluster by reducing the number of messages forwarded within the server cluster (i.e., between the primary server 170 and each secondary server 180).

Advantageously, the above systems and methods support efficient server replication even if there are interactions with non-deterministic data sources. As provided earlier, the servers are desirably identical at each point in the input, or message, stream. Thus, if one of the servers fails, there is no need to perform costly state exchange or rollbacks.

In different embodiments, the claimed subject matter may be implemented either entirely in the form of hardware or entirely in the form of software, or a combination of both hardware and software elements. For example, the primary server 170 or a secondary server 180 may comprise a controlled computing system environment that can be presented largely in terms of hardware components and software code executed to perform processes that achieve the results contemplated by the system of the claimed subject matter.

Referring to FIGS. 1A, 1B, 5, and 6, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. In one embodiment, the application layer 150 or transport layer 160 may be implemented as system software 1121 or application software 1122 executed on one or more hardware environments to implement server replication that supports interactions with non-deterministic data sources.

System software 1121 may comprise control programs, such as the operating system (OS) and information management systems that instruct the hardware how to function and process information. Application software 1122 may comprise but is not limited to program code, data structures, firmware, resident software, microcode or any other form of information or routine that may be read, analyzed or executed by a microcontroller.

In an alternative embodiment, the claimed subject matter may be implemented as computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Figure 5:
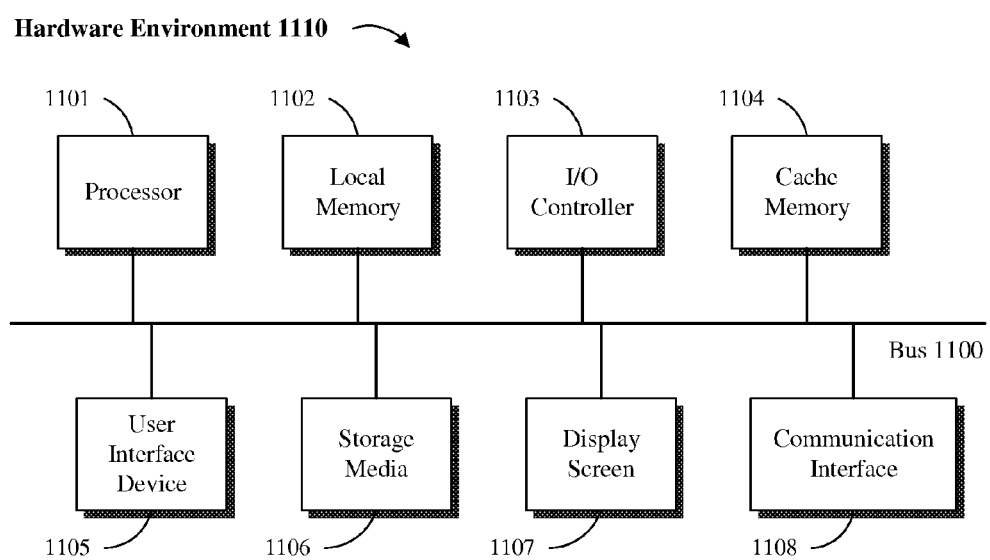
FIGS. 5 and 6 are block diagrams of hardware and software environments in which a system of the present invention may operate, in accordance with one or more embodiments.

Referring to FIG. 5, an embodiment of the application software 1122 may be implemented as computer software in the form of computer readable code executed on a data processing system such as hardware environment 1110 that comprises a processor 1101 coupled to one or more memory elements by way of a system bus 1100. The memory elements, for example, may comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Figure 6:
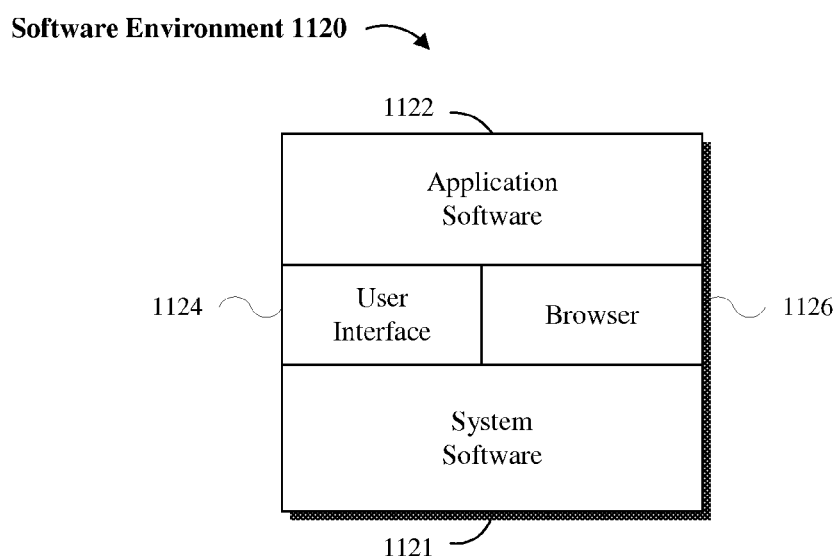

Referring to FIG. 6, application software 1122 may comprise one or more computer programs that are executed on top of system software 1121 after being loaded from storage media 1106 into local memory 1102. In a client-server architecture, application software 1122 may comprise client software and server software. For example, in one embodiment, client software is executed on the clients 120 and server software is executed on the primary server 170 and the secondary servers 180

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective processes of each method are performed are purely exemplary. Depending on implementation, the processes can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The claimed subject matter has been described above with reference to one or more features or embodiments. Those skilled in the art will recognize, however, that changes and modifications may be made to these embodiments without departing from the scope of the claimed subject matter. These and various other adaptations and combinations of the embodiments disclosed are within the scope of the claimed subject matter as defined by the claims and their full scope of equivalents.

What is claimed is:

1. A method of server state replication in a network environment, the method comprising:

processing, at a primary server, a message received from a client;

determining whether the processing of the message involves interaction with a non-deterministic data source;

if the processing of the message does not involve interaction with a non-deterministic data source, processing the message at the primary server and sending a notification, to a secondary server that is a backup of the primary server, that the primary server has finished processing the message, wherein the secondary server also received the message from the client and is configured to process the message; and if the processing of the message does involve interaction with a non-deterministic data source, processing the message at the primary server by interacting with the non-deterministic data source, conditionally sending to the secondary server, or withholding from the secondary server, information related to the interaction, wherein the secondary server is configured to process the message without interacting with the non-deterministic data source whether or not the information is sent to the secondary server, and sending a notification to the secondary server that the primary server has finished processing the message, wherein the processing and sending steps are embodied in any of
- a) computer hardware, and
- b) computer software embodied in a non-transitory computer-readable medium.

2. The method according to claim 1 wherein the sending of the notification is sent periodically.

3. The method according to claim 1 wherein the sending of the notification is sent after a predefined number of client messages have been processed by the primary server.

4. The method of claim 1 and further comprising determining at the primary server that the information related to results of the interaction between the primary server and the non-deterministic data source has been received by the secondary server.

5. The method of claim 4 and further comprising permitting the secondary server to process the message in response to determining that the information related to results of the interaction between the primary server and the non-deterministic data source has been received by the secondary server.

6. A method of server state replication in a network environment, the method comprising:
receiving, at a secondary server that is a backup of a primary server, a message from a client,
wherein the secondary server is configured to process the message using information related to results of an interaction between the primary server and a non-deterministic data source if the results are received by the secondary server, and process the message absent receipt of the information, and
wherein the interaction between the primary server and the non-deterministic data source is performed by the primary server responsive to the primary server also receiving the message from the client;
receiving, at the secondary server, an instruction to process the message from the client; and
processing, at the secondary server, the message from the client without interacting with the non-deterministic data source,
wherein the receiving and processing steps are embodied in any of
- a) computer hardware, and
- b) computer software embodied in a non-transitory computer-readable medium.

7. The method according to claim 6 wherein the processing step comprises performing a default action that is independent of the content of the information.

8. The method according to claim 6 wherein the processing step comprises processing the message absent receipt of the information by performing a default action that is associated with non-receipt of information.

* * * * *